US012693757B2

(12) United States Patent
Yao et al.

(10) Patent No.: US 12,693,757 B2
(45) Date of Patent: Jul. 28, 2026

(54) DATA PROCESSING DEVICE AND SYSTEM FOR DEMODULATING DIFFERENTIAL PHASE-SHIFT KEYING SIGNAL BY PHASE ANGLE

(71) Applicant: JADARD TECHNOLOGY INC., Shenzhen (CN)

(72) Inventors: Tuo-Yu Yao, Hsinchu (TW); Yu-Chieh Hsu, Tainan (TW)

(73) Assignee: JADARD TECHNOLOGY INC., Shenzhen (CN)

( * ) Notice: Subject to any disclaimer, the term of this patent is extended or adjusted under 35 U.S.C. 154(b) by 0 days.

(21) Appl. No.: 19/081,152

(22) Filed: Mar. 17, 2025

(65) Prior Publication Data

US 2026/0003458 A1 Jan. 1, 2026

(30) Foreign Application Priority Data

Jun. 29, 2024 (CN) .......................... 202410866344.4

(51) Int. Cl.
*G06F 3/041* (2006.01)
*G06F 3/0354* (2013.01)
*G06F 3/044* (2006.01)

(52) U.S. Cl.
CPC ...... *G06F 3/04162* (2019.05); *G06F 3/03545* (2013.01); *G06F 3/0441* (2019.05); *G06F 3/0442* (2019.05)

(58) Field of Classification Search
CPC .................................................. G06F 3/04162
See application file for complete search history.

(56) References Cited

U.S. PATENT DOCUMENTS

| 8,907,702 B1 * | 12/2014 | Solomko | ............. | H03D 13/008 |
| | | | | 327/3 |
| 2008/0253481 A1 * | 10/2008 | Rivkin | ................... | G01R 25/02 |
| | | | | 375/316 |
| 2016/0170516 A1 * | 6/2016 | Crandall | ............ | G06F 3/04164 |
| | | | | 345/174 |
| 2018/0156605 A1 * | 6/2018 | Swallow | ............... | G01N 29/00 |
| 2022/0107347 A1 * | 4/2022 | Hirai | ..................... | H03H 11/16 |

FOREIGN PATENT DOCUMENTS

TW 202235889 A 9/2022

* cited by examiner

*Primary Examiner* — Chun-Nan Lin
(74) *Attorney, Agent, or Firm* — ScienBiziP, P.C.

(57) ABSTRACT

A data processing device is provided, including a spectrum extraction circuit configured to receive a first electrode signal and obtain a first component signal having a first preset frequency in the first electrode signal; an amplitude and phase extraction circuit, electrically connected to the spectrum extraction circuit, configured to generate a differential phase-shift keying signal, the differential phase-shift keying signal includes a real part of phase and an imaginary part of phase of the first component signal; a demodulation circuit, electrically connected to the amplitude and phase extraction circuit, configured to demodulate the differential phase-shift keying signal according to a phase angle to obtain data information in the first electrode signal, the phase angle is an arctangent value of a ratio of the real part of phase to the imaginary part of phase.

18 Claims, 7 Drawing Sheets

10

DATA PROCESSING DEVICE AND SYSTEM FOR DEMODULATING DIFFERENTIAL PHASE-SHIFT KEYING SIGNAL BY PHASE ANGLE

CROSS-REFERENCE TO RELATED APPLICATIONS

This application claims priority to Chinese Patent Application No. 202410866344.4 filed on Jun. 29, 2024, in China National Intellectual Property Administration, the contents of which are incorporated by reference herein.

FIELD

The subject matter herein generally relates to field of touch control technology, particularly to a data processing device and system.

BACKGROUND

Data processing devices typically obtain data information contained in received signals through demodulation. Taking the application scenario of an active stylus touching a touch device as an example, when the stylus performs touch operations on the data processing device, the data processing device needs to perform differential phase-shift keying demodulation on the signal representing pressure sensing data from the stylus to obtain the pressure sensing data of the stylus. In existing differential phase-shift keying demodulation methods, loop filters and voltage-controlled oscillators are typically required to provide reference waves having the same frequency as the modulation carrier to obtain the phase angle of the signal to be demodulated, and further perform differential phase-shift keying demodulation based on the phase angle. However, loop filters and voltage-controlled oscillators are costly and have high power consumption.

BRIEF DESCRIPTION OF THE DRAWINGS

Implementations of the present disclosure will now be described, by way of embodiments, with reference to the attached figures.

DETAILED DESCRIPTION

Figure 1:
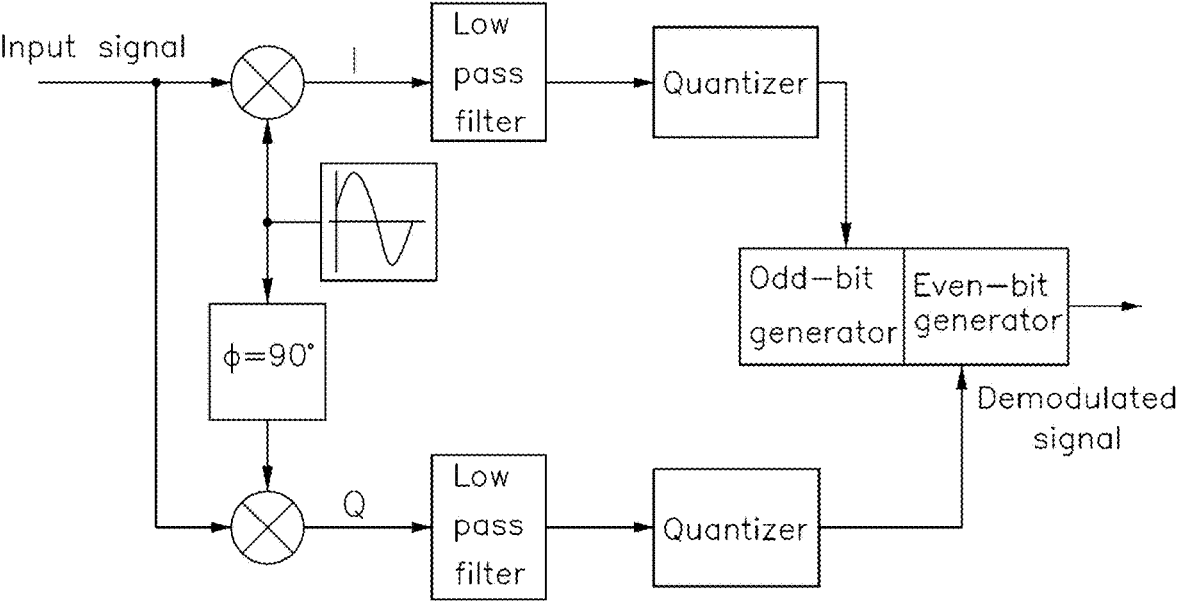
FIG. 1 is a schematic diagram of one type of a differential phase-shift keying demodulation circuit.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

Data processing devices typically obtain data information contained in received signals through demodulation. Taking the application scenario of an active stylus touching a touch device as an example, when the stylus performs touch operations on the data processing device, the data processing device needs to perform differential phase-shift keying demodulation on the signal representing pressure sensing data from the stylus to obtain the pressure sensing data of the stylus. In existing differential phase-shift keying demodulation methods, it is typically necessary to generate reference waves having the same frequency as the modulation carrier to obtain the phase angle of the signal to be demodulated, and further perform differential phase-shift keying demodulation based on the phase angle.

For example, as shown in FIG. 1, in existing differential phase-shift keying demodulation circuits, the input signal is a differential phase-shift keying signal to be demodulated, which is multiplied by reference waves through two multipliers to obtain an I signal in phase with the differential phase-shift keying signal and a Q signal orthogonal to the I signal. The reference wave is a sine or cosine wave signal having the same frequency as the modulation carrier in the differential phase-shift keying signal. Subsequently, the I signal and Q signal are processed through low-pass filtering, sampling decision, etc., to obtain the demodulated signal.

Figure 2:
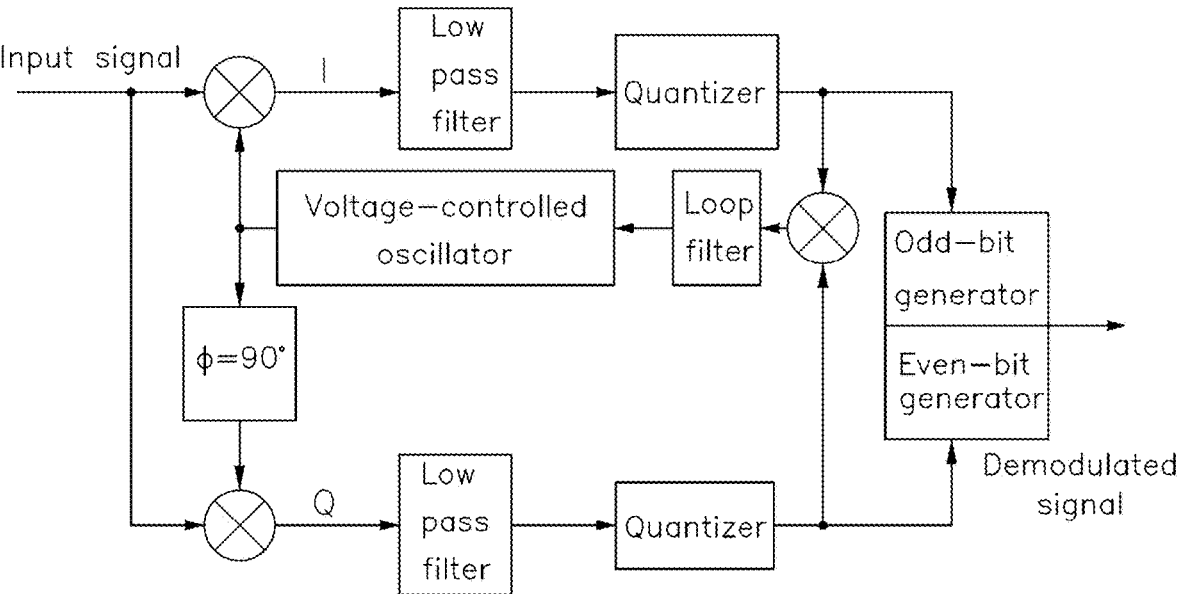
FIG. 2 is a schematic diagram of another type of the differential phase-shift keying demodulation circuit.

Further, to improve the orthogonality between the I signal and the Q signal, existing differential phase-shift keying demodulation circuits typically can also use loop filters and voltage-controlled oscillators. As shown in FIG. 2, a loop filter and a voltage-controlled oscillator form a feedback loop that can improve the generation accuracy of the reference wave, thereby improving the differential phase-shift keying demodulation accuracy of the signal. However, loop filters and voltage-controlled oscillators are costly and have high power consumption.

Therefore, the present application provides a data processing device and system that can omit loop filters and voltage-controlled oscillators to obtain the phase angle of the signal to be differential phase-shift keying demodulated, thereby reducing the cost and power consumption of the data processing device.

Figure 3:
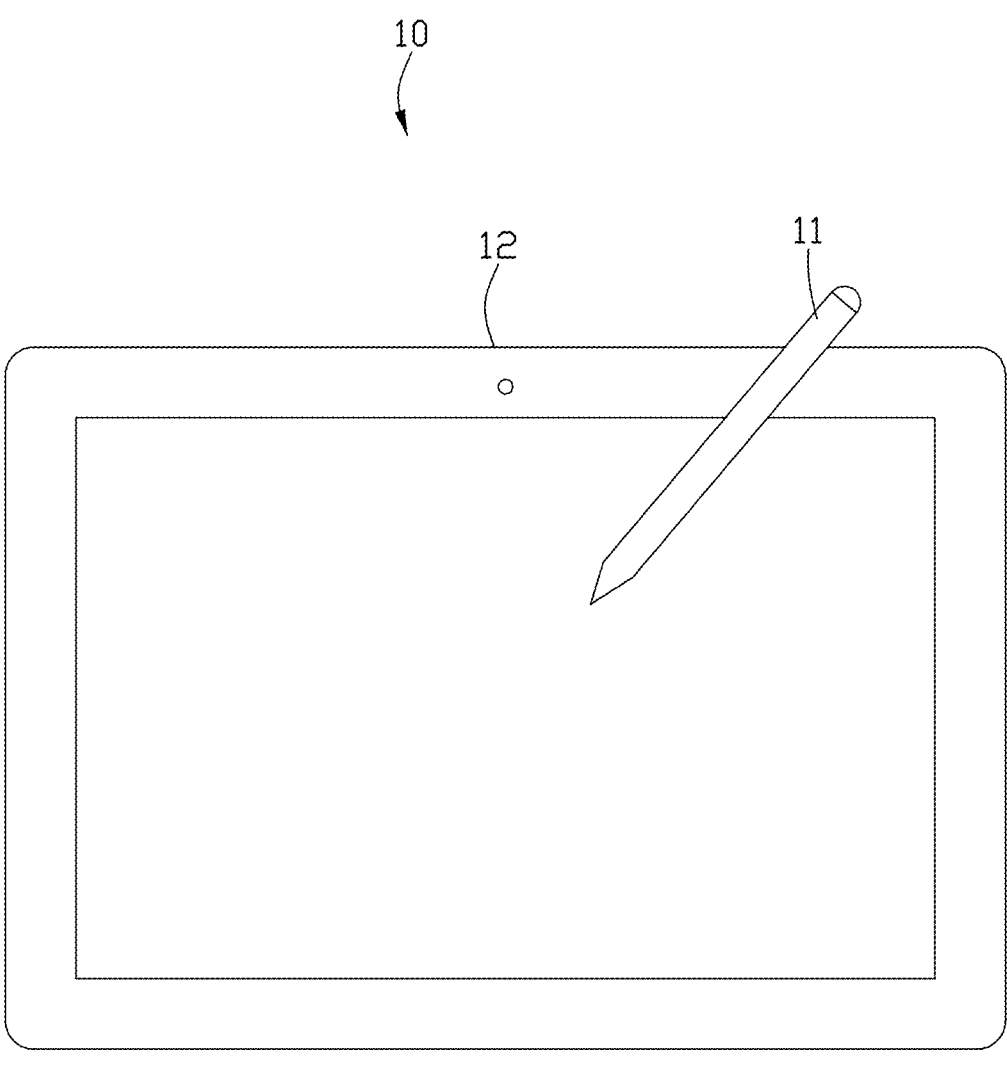
FIG. 3 is a schematic diagram of a data processing system provided by the present application.

Specifically, please refer to FIG. 3, which shows a schematic diagram of the data processing system provided by the present application. The data processing system includes a signal source and a data processing device. The signal source is used to transmit signals with specific frequencies to the data processing device. It can be understood that the signal source can be a remote controller, the data processing device can be a controlled device, etc. The present application does not place any limitations on the types of the signal source and the data processing device, as long as the signal source can transmit signals to the data processing device, and the data processing device can process the received signals to obtain the data information contained in the signals. The data processing system is explained using a touch system 10, with the signal source being a stylus 11 and the data processing device being a touch device 12 as an example.

The touch system 10 includes the stylus 11 and the touch device 12. The stylus 11 is used to provide input to the touch device 12 and perform touch operations.

In some embodiments, the touch device 12 can be an electronic device with touch functionality such as a tablet computer, touch-screen laptop, smartphone, etc. The touch device 12 includes electronic components with touch input and recognition detection functions such as a touch screen, touch panel, etc., for receiving input from the stylus 11. The touch device 12 also includes electronic components with signal detection, processing, and analysis functions such as signal processing chips, processors, etc., for detecting, processing and analyzing touch signals input by the stylus 11 to obtain pressure sensing data, position data, tilt angle data, etc. of the stylus 11. Thus, the touch device 12 can execute operations in response to touch input from the stylus 11.

In some embodiments, the stylus 11 and touch device 12 can be paired and connected through communication. For example, the stylus 11 can be paired and connected with the touch device 12 through wireless communication methods such as Wireless Local Area Network (WLAN), Bluetooth, Zigbee, Near Field Communication (NFC), etc.

In some embodiments, the stylus 11 is an active stylus. A plurality of transmitting electrodes can be arranged in the stylus 11, and signals can be transmitted to the touch device 12 through the plurality of transmitting electrodes. A capacitive electrode array can be arranged on the touch screen or touch panel of the touch device 12, through which the touch device 12 can receive signals transmitted by the stylus 11. Specifically, after wireless connection between the touch device 12 and stylus 11, the touch device 12 can send uplink signals to the stylus 11 through the capacitive electrode array, and the stylus 11 can receive the uplink signals through receiving electrodes and transmit downlink signals through transmitting electrodes. The downlink signals can include pressure sensing data of the stylus 11, etc.

In some embodiments, when the stylus 11 contacts a touch screen or a touch panel of the touch device 12, the capacitance value of the electrode at the corresponding position in the capacitive electrode array will change, causing a voltage change in that electrode. The touch device 12 can determine the specific contact position of the stylus 11 on the touch device 12 based on the electrode voltages in the capacitive electrode array.

Figure 4A:
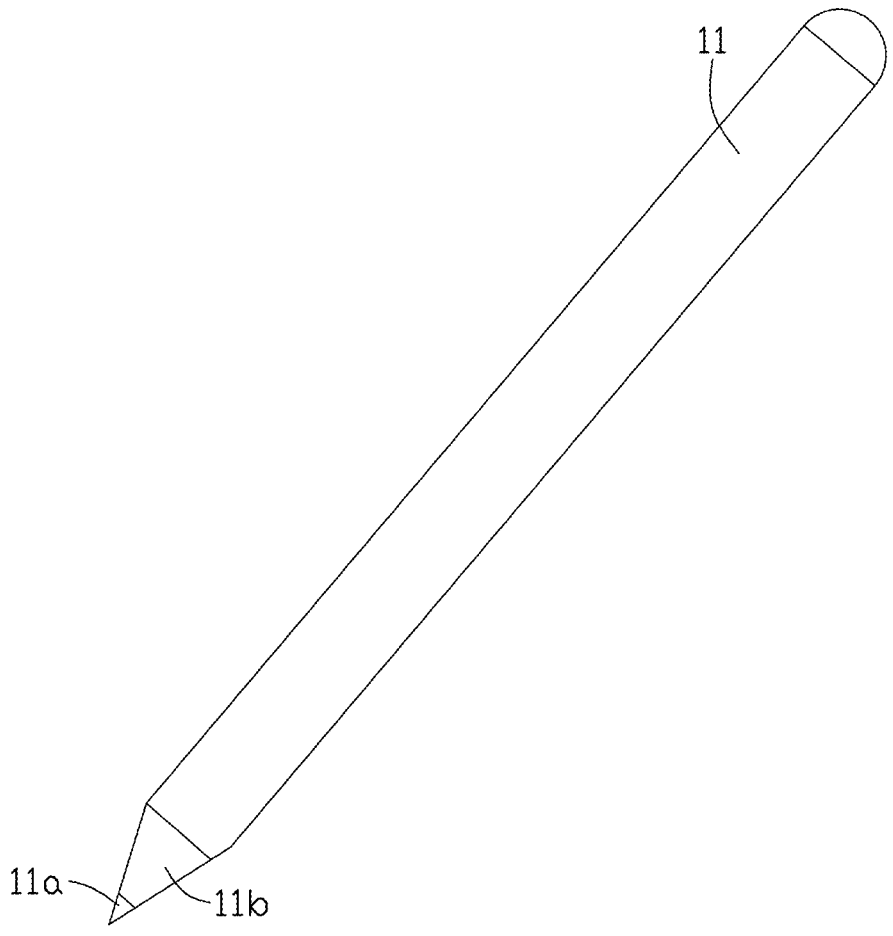
FIG. 4A is one schematic diagram of a stylus provided in an embodiment of the present application.
Figure 4B:
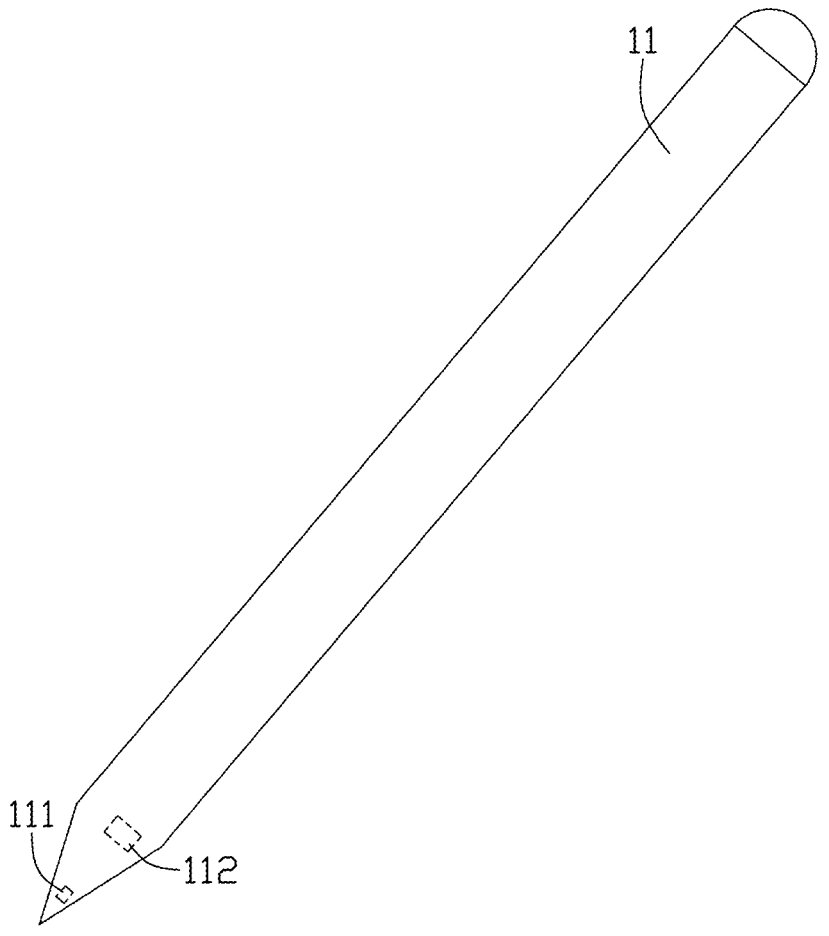
FIG. 4B is another schematic diagram of the stylus provided in an embodiment of the present application.

Please refer to FIG. 4A and FIG. 4B, which show two schematic diagrams of the stylus 11 provided in embodiments of the present application. The stylus 11 includes a first electrode 111 and a second electrode 112. The first electrode 111 is disposed at the tip 11a of the stylus 11, and the second electrode 112 is disposed at the ring 11b of the stylus 11. The ring 11b is the part between the tip 11a and the shaft or the body.

In some embodiments, both the first electrode 111 and second electrode 112 can be transmitting electrodes, or both can be receiving electrodes, or one can be a transmitting electrode while the other is a receiving electrode. The stylus 11 can also include more electrodes. Taking the example where both the first electrode 111 and second electrode 112 are transmitting electrodes.

In some embodiments, the first electrode 111 and second electrode 112 can also be positioned at other locations on the stylus 11. The present application does not place any limitations on the positioning of the first electrode 111 and second electrode 112.

When the stylus 11 contacts the touch device 12, the first electrode 111 transmits a first electrode signal to the touch device 12. The first electrode signal includes pressure sensing data of the stylus 11. The first electrode signal also includes touch position data of the first electrode 111 on the touch screen or touch panel of the touch device 12.

Regarding the pressure sensing data, since a pressure sensor is installed inside the stylus 11, through contact between the tip of the stylus and the touch screen or touch panel, the force on the tip of the stylus is transferred to the pressure sensor, which obtains pressure sensing data of the stylus 11 in response to the received tip force. The touch device 12 can draw and display lines or shapes with thickness corresponding to the pressure sensing data from the stylus 11.

The second electrode 112 transmits a second electrode signal to the touch device 12. The second electrode signal includes position data of the coupling point corresponding to the second electrode 112 on the touch screen or touch panel of the touch device 12.

Regarding the coupling point, since the second electrode 112 does not directly contact the touch screen or touch panel of the touch device 12, when the stylus 11 contacts the touch device 12, it is essentially the first electrode 111 that contacts the touch device 12, while the second electrode 112 can form coupling with the capacitive array electrodes on the touch device 12, thus having corresponding coupling points on the capacitive array electrodes.

Figure 5:
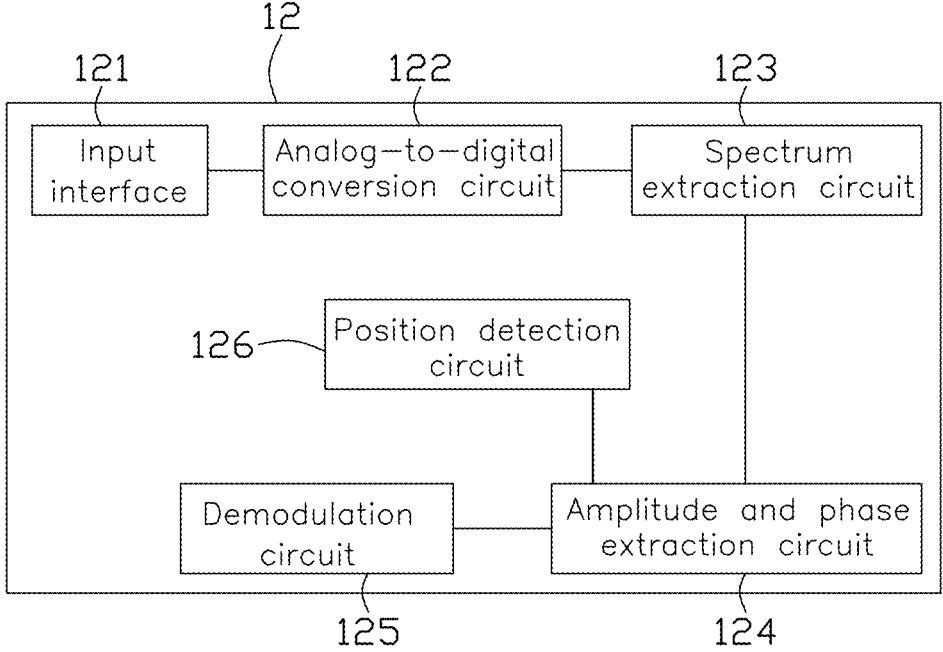
FIG. 5 is a schematic diagram of the data processing device provided by the present application.

Please refer to FIG. 5, which shows a schematic diagram of the touch device 12 provided by the present application. The touch device 12 includes an input interface 121, an analog-to-digital conversion circuit 122, a spectrum extraction circuit 123, an amplitude and phase extraction circuit 124, a demodulation circuit 125, and a position detection circuit 126.

The input interface 121 includes one or more of a touch screen and a touch panel. Capacitive array electrodes can be arranged on the input interface 121 to receive touch operations, for example, touch operations from conductive devices such as active capacitive styluses, passive capacitive styluses, or fingers. The stylus 11 can transmit the first electrode signal and the second electrode signal, which are input to the touch device 12 through the input interface 121.

The analog-to-digital conversion circuit 122 is electrically connected to the input interface 121. The analog-to-digital conversion circuit 122 is configured to perform analog-to-digital conversion on the first electrode signal and the second electrode signal received by the input interface 121. The first electrode signal is converted to a first digital electrode signal, and the second electrode signal is converted to a second digital electrode signal. Since both the first electrode signal and the second electrode signal are analog signals including specific preset frequencies, the analog-to-digital conversion circuit 122 can convert the first electrode signal and the second electrode signal to facilitate subsequent digital signal processing.

In some embodiments, the analog-to-digital conversion circuit 122 can sample the first electrode signal and the second electrode signal according to a preset sampling frequency. The preset sampling frequency can be set according to actual needs. For example, when determining and calculating the touch position of the stylus 11 by analyzing electrode voltages generated by the capacitive electrode array in response to the first electrode signal and the second electrode signal, the sampling frequency of the analog-to-digital conversion circuit 122 can be set to 100 kHz. When determining and calculating the touch position by analyzing the amplitude and/or phase of specific frequency components in the analog touch signal, the sampling frequency of the analog-to-digital conversion circuit 122 can be set to 1 MHz.

The spectrum extraction circuit 123 is electrically connected to the analog-to-digital conversion circuit 122. The spectrum extraction circuit 123 is configured to perform spectrum extraction on the first digital electrode signal and the second digital electrode signal obtained after conversion by the analog-to-digital conversion circuit 122. Specifically, the spectrum extraction circuit 123 can extract component signals corresponding to at least one preset frequency from the first digital electrode signal and the second digital electrode signal within a preset time interval. The preset time interval can be set as one detection period, meaning the spectrum extraction circuit 123 can extract component signals of at least one preset frequency from the first digital electrode signal and the second digital electrode signal within one detection period. Specifically, since the first digital electrode signal and the second digital electrode signal represent the first electrode signal and the second electrode signal with different frequencies, the spectrum extraction circuit 123 can obtain a component signal of one preset frequency from the first digital electrode signal and a component signal of a different preset frequency from the second digital electrode signal.

At this time, since the analog-to-digital conversion circuit 122 samples the first electrode signal and the second electrode signal multiple times within one detection period, the first digital electrode signal and second digital electrode signal obtained after conversion by the analog-to-digital conversion circuit 122 also have multiple data bits within one detection period. However, the component signal (such as the first component signal or second component signal) only indicates parameters such as amplitude/phase of one preset frequency in the first digital electrode signal or second digital electrode signal. Therefore, within one detection period, the number of data bits in the component signal is less than the number of data bits in the first digital electrode signal and second digital electrode signal. Thus, with reduced data bits, the amount of data to be transmitted decreases, which can improve the computational efficiency of the touch device 12 and reduce its power consumption.

The amplitude and phase extraction circuit 124 is electrically connected to the spectrum extraction circuit 123. The amplitude and phase extraction circuit 124 is configured to obtain the amplitude and/or phase values of the component signals, wherein the amplitude of the component signal is used to determine whether the stylus 11 is touching the input interface 121 and the specific touch position. The phase value of the component signal includes a real part of phase and an imaginary part of phase, which are used to indicate the pressure sensing data of the stylus 11. Specifically, the amplitude of the first component signal is used to determine whether the first electrode 111 of the stylus 11 is touching the input interface 121 and its specific touch position, while the phase value of the first component signal indicates the pressure sensing data of the stylus 11. The amplitude of the second component signal is used to determine whether the second electrode 112 of the stylus 11 forms capacitive coupling with the input interface 121 and the specific coupling position.

In some embodiments, after extracting the phase value of the component signal, the amplitude and phase extraction circuit 124 generates a differential phase-shift keying signal, which includes the real part of phase and imaginary part of phase of the first component signal.

The position detection circuit 126 is electrically connected to the amplitude and phase extraction circuit 124. The position detection circuit 126 determines whether the stylus 11 is touching the input interface 121 and the specific touch position based on the amplitude of the component signal. Specifically, when the amplitude at a position point in the first component signal exceeds a preset threshold, the calculation circuit can determine that the stylus 11 has touched the input interface 121. At this time, based on this position point, the specific electrode in the capacitive electrode array on the input interface 121 can be located, thereby obtaining the specific touch position of the first electrode 111 on the input interface 121. Similarly, the specific coupling position between the second electrode 112 and the input interface 121 can also be determined by the calculation circuit based on the position point where the amplitude in the second component signal exceeds the preset threshold.

In some embodiments, the position detection circuit 126 can also obtain the tilt angle of the stylus 11 relative to the touch device 12 based on the obtained touch position of the first electrode 111 and coupling position of the second electrode 112. Specifically, the position detection circuit 126 can calculate and obtain the tilt angle of the stylus 11 relative to the touch device 12 using tilt angle detection algorithms.

The demodulation circuit 125 is electrically connected to the amplitude and phase extraction circuit 124. The demodulation circuit 125 is configured to demodulate the differential phase-shift keying signal generated by the amplitude and phase extraction circuit 124. Specifically, the demodulation circuit 125 can demodulate the differential phase-shift keying signal according to the phase angle to obtain the pressure sensing information of the stylus 11. The phase angle is the arctangent value of the ratio between the real part of phase and imaginary part of phase of the first component signal.

In some embodiments, the demodulation circuit 125 can adaptively adjust or compensate the final obtained pressure value of the stylus 11 in combination with the tilt angle obtained by the calculation circuit. For example, when the tilt angle of the stylus 11 relative to the touch device 12 is large, the demodulation circuit 125 can adaptively reduce or decrease the obtained pressure value of the stylus 11.

Figure 6:
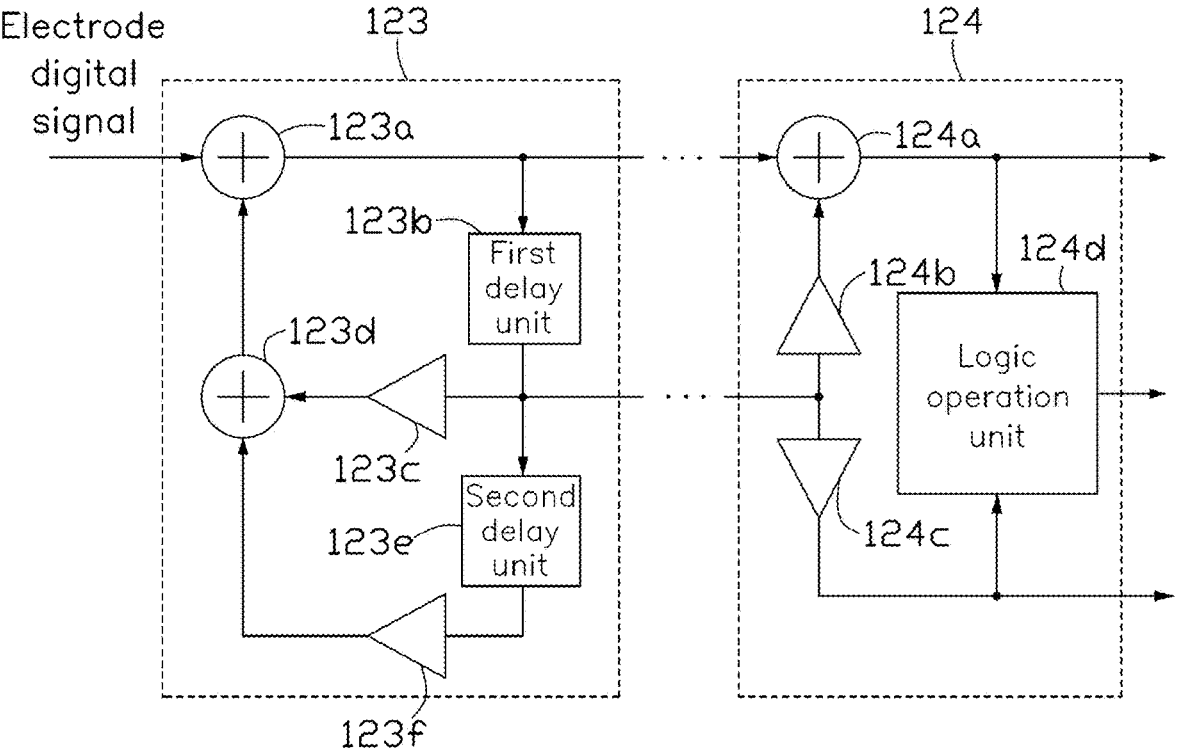
FIG. 6 is a circuit diagram of a spectrum extraction circuit and an amplitude and phase extraction circuit provided by the present application.

Please refer to FIG. 6, which shows the circuit diagram of the spectrum extraction circuit 123 and amplitude and phase extraction circuit 124 provided by the present application. The spectrum extraction circuit 123 includes a first adder 123a, a first delay unit 123b, a first amplifier 123c, a second adder 123d, a second delay unit 123e, and a second amplifier 123f.

The first input terminal of the first adder 123a receives the digital electrode signal (for example, the first digital electrode signal and/or the second digital electrode signal), the second input terminal of the first adder 123a is connected to the output terminal of the second adder, and the output terminal of the first adder 123*a* is the first output terminal of the spectrum extraction circuit 123, which is used to output the component signal Q[n] corresponding to the digital electrode signal. The output terminal of the spectrum extraction circuit 123 is also connected to the input terminal of the first delay unit 123*b*, and the output terminal of the first delay unit 123*b* is the second output terminal of the spectrum extraction circuit 123, which is used to output the component delay signal Q[n−1] corresponding to the digital electrode signal. The component delay signal is a signal delayed by one position in the time domain from the component signal. The output terminal of the first delay unit 123*b* is also connected to the input terminal of the second delay unit 123*e* and the input terminal of the first amplifier 123*c*, the output terminal of the first amplifier 123*c* is connected to the first input terminal of the second adder 123*d*, the output terminal of the second delay unit 123*e* is connected to the input terminal of the second amplifier 123*f*, the output terminal of the second amplifier 123*f* is connected to the first input terminal of the second adder 123*d*, and the output terminal of the second amplifier 123*f* is connected to the second input terminal of the second adder 123*d*.

The amplification coefficient of the first amplifier 123*c* is associated with the preset frequency value of the component signal. Therefore, by changing the amplification coefficient of the first amplifier 123*c*, the preset frequency value of the component signal can be adjusted. This can change the frequency components that need to be extracted from the first digital electrode signal and/or the second digital electrode signal.

Specifically, the component signal Q[n] output by the spectrum extraction circuit 123 satisfies the following formula (1):

$$Q[n] = pQ[n-1] - Q[n-2] + x[n] \tag{1}$$

Where p is the amplification coefficient of the first amplifier 123*c*, typically $$p = 2\cos\left(\frac{2\pi k}{N}\right),$$

N is the number of samples taken by the spectrum extraction circuit 123 in one detection period, k is the number of complete cycles of the target frequency (i.e., preset frequency) contained in one detection period. Q[n−2] is the signal delayed by one position in the time domain from the component delay signal, i.e., the signal delayed by two positions in the time domain from the component signal. x[n] is the input first digital electrode signal or second digital electrode signal.

In some embodiments, the first amplifier 123*c* can have multiple amplification coefficients, and by switching to different amplification coefficients within one detection period, multiple component signals corresponding to multiple frequencies of the digital electrode signal can be obtained. For example, the first amplifier 123*c* has a first amplification coefficient and a second amplification coefficient, where the first amplification coefficient $$p1 = 2\cos\left(\frac{2\pi k1}{N}\right),$$

the second amplification coefficient $$p2 = 2\cos\left(\frac{2\pi k2}{N}\right),$$

where k1 is the number of complete cycles of the first preset frequency component of the first component signal in one detection period, k2 is the number of complete cycles of the second preset frequency component of the second component signal in one detection period.

Thus, the touch device 12 can obtain the first component signal by switching to the first amplification coefficient, and obtain the second component signal by switching to the second amplification coefficient. In other words, the touch device 12 can obtain the position information of the first electrode 111 and the pressure sensing information of the stylus 11, as well as the position information of the second electrode 112 within one detection period.

After the spectrum extraction circuit 123 outputs the component signal Q[n] and the component delay signal Q[n−1], they are transmitted to the amplitude and phase extraction circuit 124. The amplitude and phase extraction circuit 124 includes an adder 124*a*, a third amplifier 124*b*, a fourth amplifier 124*c*, and a logic operation unit 124*d*. The first input terminal of the adder 124*a* is connected to the corresponding shifter 124 through the data bus 13 to receive the first component signal Q[n], the second input terminal of the adder 124*a* is connected to the output terminal of the third amplifier 124*b*, the output terminal of the adder 124*a* is connected to the first input terminal of the logic operation unit 124*d*, and simultaneously outputs a phase real part signal re representing the real part of phase of the digital electrode signal at the preset frequency. The input terminal of the third amplifier 124*b* is connected to the input terminal of the fourth amplifier 124*c* to receive the component delay signal Q[n−1]. The output terminal of the fourth amplifier 124*c* is connected to the second input terminal of the logic operation unit 124*d*, and simultaneously outputs a phase imaginary part signal im representing the imaginary part of phase of the digital electrode signal at the preset frequency. The logic operation unit 124*d* calculates an amplitude signal amp representing the amplitude of the digital electrode signal at the preset frequency based on the phase real part signal re and the phase imaginary part signal im. Specifically, the amplitude signal amp satisfies the following formula (2):

$$amp = \sqrt{re^2 + im^2} \tag{2}$$

The demodulation circuit 125 can demodulate the differential phase-shift keying signal, which includes the phase real part signal re and phase imaginary part signal im output by the amplitude and phase extraction circuit 124, according to the phase angle. Specifically, differential phase-shift keying (DPSK) can be divided into differential binary phase-shift keying (DBPSK) and differential quadrature phase-shift keying (DQPSK). Differential binary phase-shift keying signals need to analyze whether the angle between the current signal point and the previous signal point is 0 degrees or 180 degrees to obtain the corresponding demodulated signal. Differential quadrature phase-shift keying signals need to analyze whether the angle between the current signal point and the previous signal point is 0 degrees, 90 degrees, 180 degrees, or 270 degrees to obtain the corresponding demodulated signal. The angle between the current signal point and the previous signal point is the difference between their phase angles, where the phase angle is the arctangent value of the ratio between the real part value indicated by the phase real part signal re and the imaginary part value indicated by the phase imaginary part signal im.

Therefore, the spectrum extraction circuit 123 working together with the amplitude and phase extraction circuit 124 can obtain the phase real part signal re and phase imaginary part signal im corresponding to the first electrode signal, and perform differential phase-shift keying demodulation on the phase real part signal re and phase imaginary part signal im based on the phase angle obtained from them, without the need for loop filters and voltage-controlled oscillators. Moreover, it can simultaneously obtain the position information of the first electrode 111, the pressure sensing information of the stylus 11, and the position information of the second electrode 112 within one detection period, improving the working efficiency of the touch device 12 and reducing its cost and power consumption.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A data processing device comprising:
   a spectrum extraction circuit configured to receive a first electrode signal and obtain a first component signal having a first preset frequency in the first electrode signal;
   an amplitude and phase extraction circuit, electrically connected to the spectrum extraction circuit, configured to generate a differential phase-shift keying signal, the differential phase-shift keying signal comprising a real part of phase and an imaginary part of phase of the first component signal;
   a demodulation circuit, electrically connected to the amplitude and phase extraction circuit, configured to demodulate the differential phase-shift keying signal according to a phase angle to obtain data information in the first electrode signal, wherein the phase angle is an arctangent value of a ratio of the real part of phase to the imaginary part of phase;
   wherein the spectrum extraction circuit comprises a first adder and a first amplifier, a second input terminal of the first adder receives the first electrode signal and/or a second electrode signal, the output terminal of the first adder correspondingly outputs the first component signal and/or a second component signal;
   the amplitude and phase extraction circuit comprises a third adder, a third amplifier, a fourth amplifier and a logic operation unit, a first input terminal of the third adder is connected to the output terminal of the first adder, a second input terminal of the third adder is connected to an output terminal of the third amplifier, an output terminal of the third adder is connected to a first input terminal of the logic operation unit, the output terminal of the third adder is configured to output the real part of phase of the first component signal, an input terminal of the third amplifier is connected to an input terminal of the fourth amplifier and an input terminal of the first amplifier, an output terminal of the fourth amplifier is connected to a second input terminal of the logic operation unit, the output terminal of the fourth amplifier is configured to output the imaginary part of phase of the first component signal, an output terminal of the logic operation unit is configured to output an amplitude of the first component signal and/or an amplitude of the second component signal.

2. The data processing device according to claim 1, wherein the data processing device is a touch device, the touch device is operated by an active stylus, the active stylus comprises a first electrode disposed at a tip, the touch device receives the first electrode signal from the first electrode, and the data information of the first electrode signal comprises pressure sensing data of the active stylus.

3. The data processing device according to claim 2, wherein the data information of the first electrode signal further comprises position information of the first electrode, the amplitude and phase extraction circuit is further configured to obtain the amplitude of the first component signal;
   the data processing device further comprises a position detection circuit, the position detection circuit is electrically connected to the amplitude and phase extraction circuit, the position detection circuit is configured to obtain a position of the first electrode according to the amplitude of the first component signal.

4. The data processing device according to claim 3, wherein the active stylus further comprises a second electrode, the first electrode and the second electrode are disposed separately, the second electrode transmits the second electrode signal to the data processing device, the first electrode signal and the second electrode signal have different frequencies;
   the spectrum extraction circuit is further configured to obtain the second component signal having a second preset frequency in the second electrode signal, the second electrode signal comprises position information of the second electrode;
   the amplitude and phase extraction circuit is further configured to obtain the amplitude of the second component signal;
   the position detection circuit is further configured to obtain a position of the second electrode according to the amplitude of the second component signal.

5. The data processing device according to claim 4, wherein the position detection circuit is further configured to obtain a tilt angle of the active stylus according to the position of the first electrode and the position of the second electrode.

6. The data processing device according to claim 4, wherein the spectrum extraction circuit further comprises a first delay unit and a second adder, an output terminal of the first adder is connected to a first input terminal of the first adder through the first delay unit, the first amplifier and the second adder.

7. The data processing device according to claim 6, wherein the first amplifier has a first amplification coefficient and a second amplification coefficient, the first amplification coefficient is associated with the first preset frequency, and the second amplification coefficient is associated with the second preset frequency.

8. The data processing device according to claim 6, wherein the logic operation unit is configured to obtain the amplitude of the first component signal according to the real part of phase and the imaginary part of phase of the first component signal, and is further configured to obtain the amplitude of the second component signal according to a real part of phase and an imaginary part of phase of the second component signal.

9. The data processing device according to claim 4, further comprising an analog-to-digital conversion circuit, wherein the analog-to-digital conversion circuit is electrically connected to the spectrum extraction circuit, the analog-to-digital conversion circuit is configured to sample the first electrode signal and the second electrode signal according to a preset sampling frequency.

10. A data processing system, comprising:
a signal source;
a data processing device, the signal source configured to output a first electrode signal to the data processing device, the data processing device comprising:
a spectrum extraction circuit configured to receive the first electrode signal and obtain a first component signal having a first preset frequency in the first electrode signal;
an amplitude and phase extraction circuit, electrically connected to the spectrum extraction circuit, configured to generate a differential phase-shift keying signal, the differential phase-shift keying signal comprising a real part of phase and an imaginary part of phase of the first component signal;
a demodulation circuit, electrically connected to the amplitude and phase extraction circuit, configured to demodulate the differential phase-shift keying signal according to a phase angle to obtain data information in the first electrode signal, wherein the phase angle is an arctangent value of a ratio of the real part of phase to the imaginary part of phase;
wherein the spectrum extraction circuit comprises a first adder and a first amplifier, a second input terminal of the first adder receives the first electrode signal and/or a second electrode signal, the output terminal of the first adder correspondingly outputs the first component signal and/or a second component signal;
the amplitude and phase extraction circuit comprises a third adder, a third amplifier, a fourth amplifier and a logic operation unit, a first input terminal of the third adder is connected to the output terminal of the first adder, a second input terminal of the third adder is connected to an output terminal of the third amplifier, an output terminal of the third adder is connected to a first input terminal of the logic operation unit, the output terminal of the third adder is configured to output the real part of phase of the first component signal, an input terminal of the third amplifier is connected to an input terminal of the fourth amplifier and an input terminal of the first amplifier, an output terminal of the fourth amplifier is connected to a second input terminal of the logic operation unit, the output terminal of the fourth amplifier is configured to output the imaginary part of phase of the first component signal, an output terminal of the logic operation unit is configured to output an amplitude of the first component signal and/or an amplitude of the second component signal.

11. The data processing system according to claim 10, wherein the data processing device is a touch device, the touch device is operated by an active stylus, the active stylus comprises a first electrode disposed at a tip, the touch device receives the first electrode signal from the first electrode, and the data information of the first electrode signal comprises pressure sensing data of the active stylus.

12. The data processing system according to claim 11, wherein the data information of the first electrode signal further comprises position information of the first electrode, the amplitude and phase extraction circuit is further configured to obtain the amplitude of the first component signal;
the data processing device further comprises a position detection circuit, the position detection circuit is electrically connected to the amplitude and phase extraction circuit, the position detection circuit is configured to obtain a position of the first electrode according to the amplitude of the first component signal.

13. The data processing system according to claim 12, wherein the active stylus further comprises a second electrode, the first electrode and the second electrode are disposed separately, the second electrode transmits the second electrode signal to the data processing device, the first electrode signal and the second electrode signal have different frequencies;
the spectrum extraction circuit is further configured to obtain the second component signal having a second preset frequency in the second electrode signal, the second electrode signal comprises position information of the second electrode;
the amplitude and phase extraction circuit is further configured to obtain the amplitude of the second component signal;
the position detection circuit is further configured to obtain a position of the second electrode according to the amplitude of the second component signal.

14. The data processing system according to claim 13, wherein the position detection circuit is further configured to obtain a tilt angle of the active stylus according to the position of the first electrode and the position of the second electrode.

15. The data processing system according to claim 13, wherein the spectrum extraction circuit further comprises a first delay unit and a second adder, an output terminal of the first adder is connected to a first input terminal of the first adder through the first delay unit, the first amplifier and the second adder.

16. The data processing system according to claim 15, wherein the first amplifier has a first amplification coefficient and a second amplification coefficient, the first amplification coefficient is associated with the first preset frequency, and the second amplification coefficient is associated with the second preset frequency.

17. The data processing system according to claim 15, wherein the logic operation unit is configured to obtain the amplitude of the first component signal according to the real part of phase and the imaginary part of phase of the first component signal, and is further configured to obtain the amplitude of the second component signal according to a real part of phase and an imaginary part of phase of the second component signal.

18. The data processing system according to claim 13, wherein the data processing device further comprises an analog-to-digital conversion circuit, the analog-to-digital conversion circuit is electrically connected to the spectrum extraction circuit, the analog-to-digital conversion circuit is configured to sample the first electrode signal and the second electrode signal according to a preset sampling frequency.

* * * * *